(12) United States Patent
Naito et al.

(10) Patent No.: US 12,288,914 B2
(45) Date of Patent: Apr. 29, 2025

(54) FUEL CELL SYSTEM AND METHOD FOR MANUFACTURING THE SAME

(71) Applicant: HONDA MOTOR CO., LTD., Tokyo (JP)

(72) Inventors: Hideharu Naito, Wako (JP); Takashi Takura, Wako (JP); Izumi Sugiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 439 days.

(21) Appl. No.: 17/678,313

(22) Filed: Feb. 23, 2022

(65) Prior Publication Data

US 2022/0285718 A1 Sep. 8, 2022

(30) Foreign Application Priority Data

Mar. 5, 2021 (JP) ................................ 2021-035221

(51) Int. Cl.
 *H01M 8/2475* (2016.01)
(52) U.S. Cl.
 CPC ...... *H01M 8/2475* (2013.01); *H01M 2250/20* (2013.01)
(58) Field of Classification Search
 CPC ............................................... H01M 2250/20
 See application file for complete search history.

(56) References Cited

U.S. PATENT DOCUMENTS

| 2016/0226084 A1 | 8/2016 | Itoga |
| 2020/0067108 A1 | 2/2020 | Yoshitomi et al. |

FOREIGN PATENT DOCUMENTS

| CN | 210007320 U | | 1/2020 |
| JP | 60-118324 A | | 6/1985 |
| JP | H08117908 A | * | 5/1996 |
| JP | 2007-141636 A | | 6/2007 |
| JP | 2011129333 A | * | 6/2011 |
| JP | 2012-028119 A | | 2/2012 |
| JP | 2015-076152 A | | 4/2015 |

OTHER PUBLICATIONS

JPH08117908A_Annotated machine translation (Year: 1996).*
JP2011129333A_Machine translation (Year: 2011).*
JPS60118324A_Annoated machine translation (Year: 1985).*
Office Action and search report dated Oct. 30, 2024 issued in the corresponding Chinese Patent Application No. 202210167393.X with a partial English machine translation.

* cited by examiner

*Primary Examiner* — Haroon S. Sheikh
*Assistant Examiner* — Aryana Y. Ortiz
(74) *Attorney, Agent, or Firm* — Carrier, Shende & Associates P.C.; Joseph P. Carrier; Fulchand P. Shende (57) ABSTRACT

An opening is formed at an end portion of a stack case that houses a fuel cell stack. A unit cell constituting a fuel cell stack is provided with a cell voltage detection terminal at a position facing an opening. A conductor extends from the cell voltage detection terminal. The opening is covered with a porous cover that is formed with a plurality of through-holes. The porous cover is formed with an annular protrusion on an end face facing the cell voltage detection terminal. The annular protrusion is located among the plurality of through-holes.

7 Claims, 13 Drawing Sheets

FUEL CELL SYSTEM AND METHOD FOR MANUFACTURING THE SAME

CROSS-REFERENCE TO RELATED APPLICATIONS

This application is based upon and claims the benefit of priority from Japanese Patent Application No. 2021-035221 filed on Mar. 5, 2021, the contents of which are incorporated herein by reference.

BACKGROUND OF THE INVENTION

Field of the Invention

The present invention relates to a fuel cell system that is provided with a fuel cell stack and a stack case, and a method for manufacturing the same.

Description of the Related Art

When a fuel cell system including a fuel cell stack is mounted in a vehicle, for example, as described in JP 2015-076152 A, particularly FIGS. 1 to 5, the fuel cell stack is housed in a stack case. In the stack case disclosed in JP 2015-076152 A, as shown in FIG. 1 of JP 2015-076152 A, an opening is formed in the wall surface covering the end portion in the stacking direction of a unit cell. The opening is covered with a ventilation cover. In this configuration, when hydrogen gas leaks from the fuel cell stack, the hydrogen gas is discharged to the outside of the stack case through the ventilation cover.

A fuel cell stack is formed by stacking a plurality of unit cells. A cell voltage detection terminal is electrically connected to an electrode of each unit cell. The cell voltage detection terminal is also referred to as a "cell V terminal". In order to facilitate maintenance at or in the vicinity of the cell V terminal, it is common to conform a portion where the cell V terminal is provided, to an opening formed in the stack case. That is, the cell V terminal is exposed to the opening. In this case, the operator can perform maintenance by inserting his/her hand through the opening after removing the ventilation cover.

SUMMARY OF THE INVENTION

From the cell V terminal, a conductor or a harness in which conductors are bundled up extends. It is possible that a conductor or harness blocks a ventilation through hole of the ventilation cover. In this case, it becomes difficult to discharge hydrogen gas or the like in the stack case to the outside of the stack case through the ventilation cover.

When the ventilation cover is made of a resin material, the ventilation cover is manufactured by injection molding using molten resin. In this case, the ventilation cover is pressed by an ejector pin in order to release the obtained ventilation cover from a mold. As a result, there is a possibility that burrs are formed on the portion pressed by the ejector pin. If the burr is caught on the conductor or harness, there is a concern that the conductor or harness may be damaged.

It is a primary object of the present invention to provide a fuel cell system and a method for manufacturing the same that can avoid blocking of openings of a porous cover by a conductor extending from a cell voltage detection terminal. The term "conductor" includes a harness that is a bundle of conductors.

It is another object of the present invention to provide a fuel cell system and a method for manufacturing the same capable of avoiding the occurrence of damage to a conductor.

According to an embodiment of the present invention, there is provided a fuel cell system comprising: a fuel cell stack in which a plurality of unit cells are stacked; and a stack case that houses the fuel cell stack, wherein:
an opening is formed at an end portion of the stack case;
a cell voltage detection terminal electrically connected to an electrode of the unit cell is provided at a position of the unit cell facing the opening, and a conductor extends from the cell voltage detection terminal;
a porous cover formed with a plurality of through-holes is provided so as to cover the opening;
an annular protrusion located among the plurality of through-holes is formed on an end face of the porous cover facing the cell voltage detection terminal; and
a top surface and an inner peripheral side surface of the annular protrusion are continuous with each other via an inner curved portion and the top surface and an outer peripheral side surface are continuous with each other via an outer curved portion.

According to another embodiment of the present invention, a method for manufacturing a fuel cell system including: a fuel cell stack in which a plurality of unit cells are stacked; and a stack case that houses the fuel cell stack, the method comprising:
a step of producing a member for a porous cover in which a plurality of through-holes are formed, annular protrusions protruding among the plurality of through-holes are formed on one end surface, a top surface and an inner peripheral side surface of the annular protrusions are continuous with each other via an inner curved portion, and the top surface and an outer peripheral side surface are continuous with each other via an outer curved portion; and
a step of housing the fuel cell stack in the stack case and covering an opening formed at an end face of the stack case with a porous cover including at least the member;
wherein
the fuel cell stack is housed in the stack case in a manner that a cell voltage detection terminal electrically connected to an electrode of the unit cell and a conductor extending from the cell voltage detection terminal face the opening, and the opening is covered with the porous cover in a manner that the annular protrusion faces the cell voltage detection terminal.

According to the present invention, the porous cover is formed with an annular protrusion on the end face facing the cell voltage detection terminal of the unit cell. The annular protrusion contacts the conductor extending from the cell voltage detection terminal, thereby preventing the spaces of the porous cover from being blocked by the conductor. Accordingly, in a case where hydrogen leaks from the fuel cell stack into the stack case, the hydrogen can be easily discharged out of the stack case through the porous cover.

Further, the annular protrusion is formed in a manner that the top surface and the inner peripheral side surface are continuous with each other via the inner curved portion, and the top surface and the outer peripheral side surface are continuous with each other via the outer curved portion. That is, the annular protrusion is not formed with a sharp portion. Therefore, the conductor is not caught by the annular protrusion. Therefore, it is possible to avoid a situation where this causes damage to the conductor. In other words, it is possible to eliminate the possibility that the conductor is damaged.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Hereinafter, a fuel cell system according to the present invention and a method for manufacturing the same will be described in detail with reference to the accompanying drawings. In the following description, a mode in which the system is mounted in a vehicle will be described as a preferred embodiment. In the following description, "left", "right", "front", "rear", "down" and "up" refer to the left, right, front, rear, downward and upward directions of a user seated in the driver's seat of a vehicle. Further, the vehicle width direction has the same meaning as the left-right direction. The vehicle length direction is the same as the front-rear direction or the traveling direction. The vehicle height direction is the same as the up-down direction.

Figure 1:
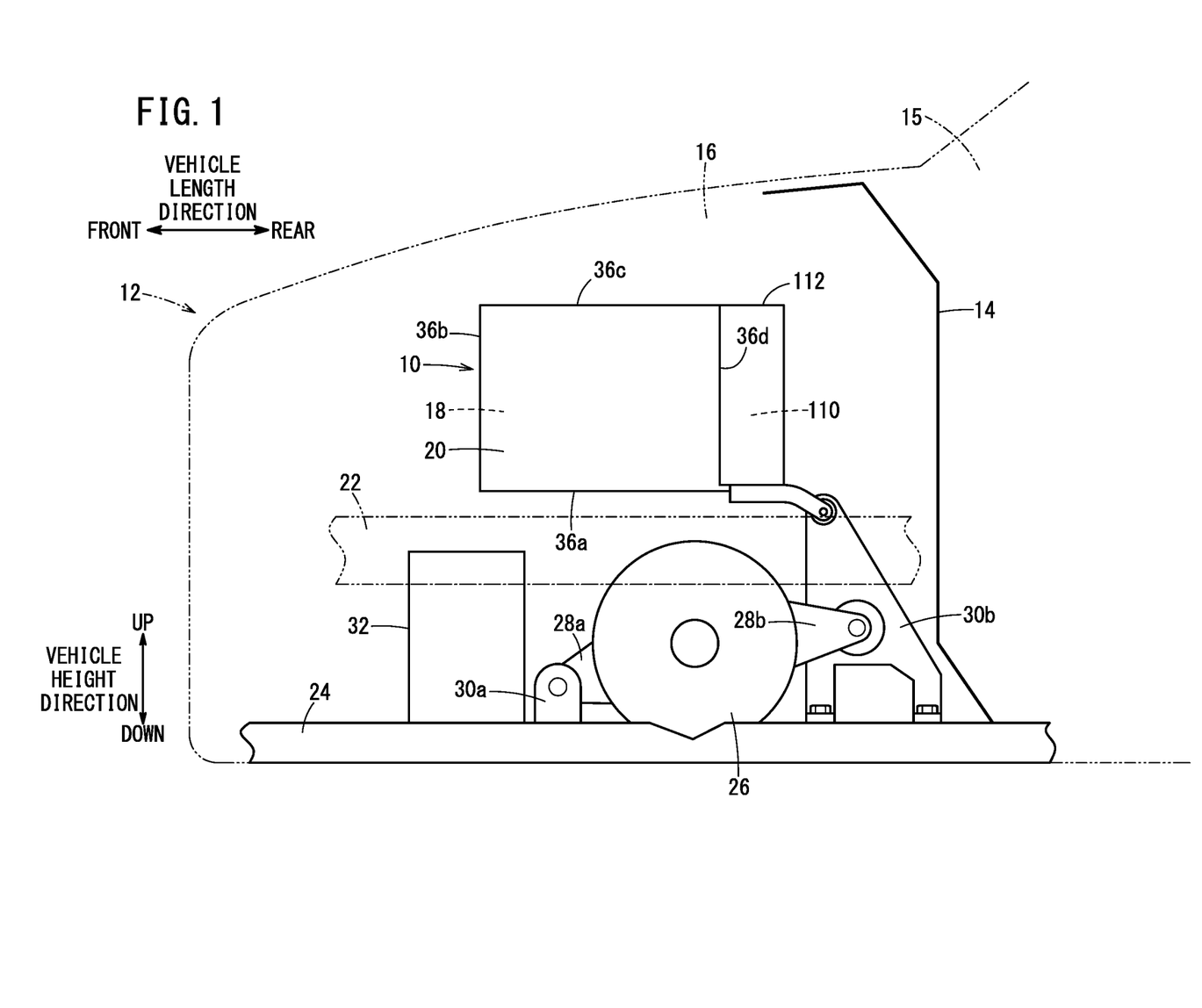
FIG. 1 is a schematic side view of a main part of a vehicle in which a fuel cell system according to an embodiment of the present invention is mounted.

FIG. 1 is a schematic side view of a main part of a fuel cell vehicle 12 (vehicle) in which a fuel cell system 10 according to the present embodiment is mounted. A dashboard 14 is provided at a front portion of the fuel cell vehicle 12. The dashboard 14 separates a passenger compartment 15 from a front room 16. A stack case 20 that houses a fuel cell stack 18 is disposed in the front room 16.

The front room 16 is provided with a side frame 22 and a cross member 24 constituting a vehicle body frame. The side frame 22 extends in the longitudinal direction of the vehicle. The cross member 24 extends in the vehicle width direction below the side frame 22.

The fuel cell stack 18 generates electric power based on electrochemical reactions of fuel gas and oxygen-containing gas supplied from a fuel gas supply device and an oxygen-containing gas supply device (neither of which is shown), respectively. The fuel cell stack 18 supplies electric power generated through power generation to a traveling motor 26 provided in the front room 16 or a battery (not shown).

In this case, the traveling motor 26 is disposed below the fuel cell stack 18 or the stack case 20. The traveling motor 26 drives the fuel cell vehicle 12 through a transmission, wheels, and the like (not shown). The front portion of the traveling motor 26 is fixed to the cross member 24 via a motor bracket 28a and a front support 30a. The rear portion of the traveling motor 26 is fixed to the cross member 24 via a motor bracket 28b and a rear support 30b.

A power drive unit (PDU) 32 is provided in front of the traveling motor 26. The PDU 32 supplies appropriate power to the traveling motor 26. The PDU 32 is configured as a three phase bridge type inverter. The PDU 32 converts electric power (DC power) of the fuel cell stack 18 into AC power. Alternatively, the PDU 32 adjusts the rotational driving force of the traveling motor 26 under the control of an ECU (not shown).

Figure 2:
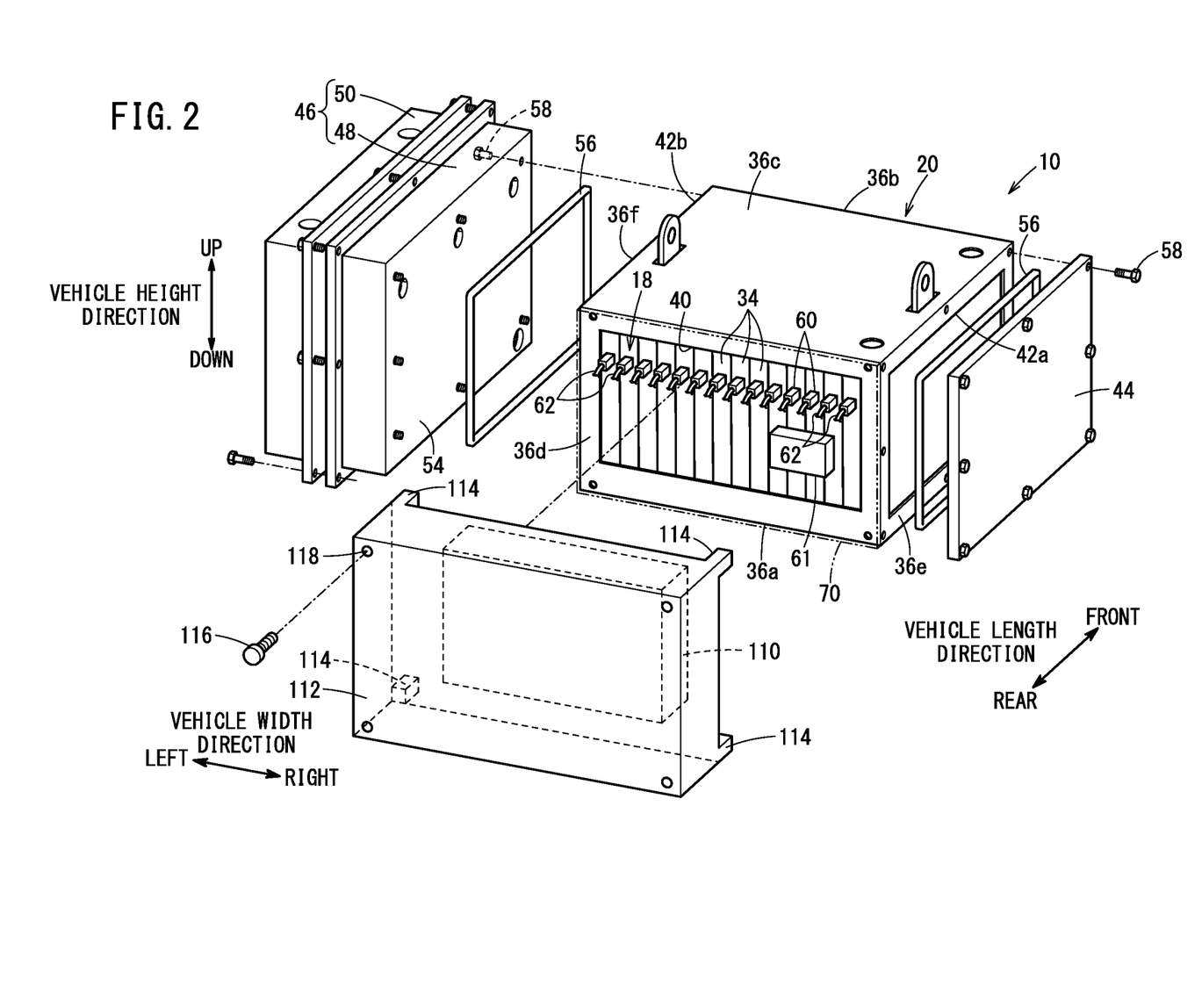
FIG. 2 is a schematic perspective view from behind a stack case constituting the fuel cell system.

As shown in FIG. 2, the fuel cell stack 18 includes a plurality of unit cells 34 stacked along the vehicle width direction. In this state, the fuel cell stack 18 is housed in the stack case 20. At this time, the electrodes of the unit cells 34 are in a standing position.

The stack case 20 has a bottom wall portion 36a, a front wall portion 36b, and an upper wall portion 36c. A rear opening 40 is formed in a rear portion 36d of the stack case 20. A right opening 42a and a left opening 42b are formed in a right side portion 36e and a left side portion 36f in the vehicle width direction of the stack case 20, respectively.

At the right end of a unit cell 34 in the stacking direction (vehicle width direction), a first terminal plate and a first insulating plate (not shown) are arranged in this order toward the outside. The first terminal plate and the first insulating plate are housed in the stack case 20. A first end plate 44 is attached to the right side portion 36e of the stack case 20. The first end plate 44 closes the right opening 42a of the stack case 20 and applies a clamping load in the stacking direction to the stack of unit cells 34.

Similarly, at the left end of the unit cell 34 in the stacking direction, a second terminal plate and a second insulating plate (not shown) are arranged in this order toward the outside. The second terminal plate and the second insulating plate are housed in the stack case 20. An auxiliary machine case 46 is attached to the left side portion 36f of the stack case 20.

The auxiliary machine case 46 has a first case member 48 having a concave shape and a second case member 50 having a concave shape. The first case member 48 is screwed to the stack case 20. The second case member 50 is joined to the first case member 48. Inside the first case member 48 and the second case member 50, hydrogen system auxiliary devices such as pipes, injectors, hydrogen pumps, and valves are housed. The hydrogen system auxiliary devices constitute a hydrogen gas supply device that is a device of the fuel cell system. Other auxiliary devices may be accommodated in the first case member 48 and the second case member 50.

The first case member 48 has a wall portion 54. The wall portion 54 closes the left opening 42*b* on the left end side in the stacking direction of the stack case 20. The wall portion 54 functions as a second end plate, and applies a clamping load in the stacking direction to the stack of unit cells 34. The first end plate 44 and the wall portion 54 are attached to the stack case 20 by connection bolts 58. A seal member 56 is interposed between the member 44 and the stack case 20 and between the member 54 and the stack case 20.

Electrodes (anode electrode and cathode electrode) at both ends of the stacked unit cells 34 are electrically connected to the first terminal plate and the second terminal plate. Further, a part of both terminal plates protrudes outside from openings of the upper wall portion 36*c* of the stack case 20 and is electrically connected to a VCU 110 through a contactor (not shown). A cell V terminal (cell voltage detection terminal) 60 is electrically connected to the electrode of each unit cell 34. Although not particularly shown, a connection portion is provided at the outer peripheral edge of the separator of each unit cell 34. The cell V terminal 60 is electrically connected to the connection portion.

Figure 3:
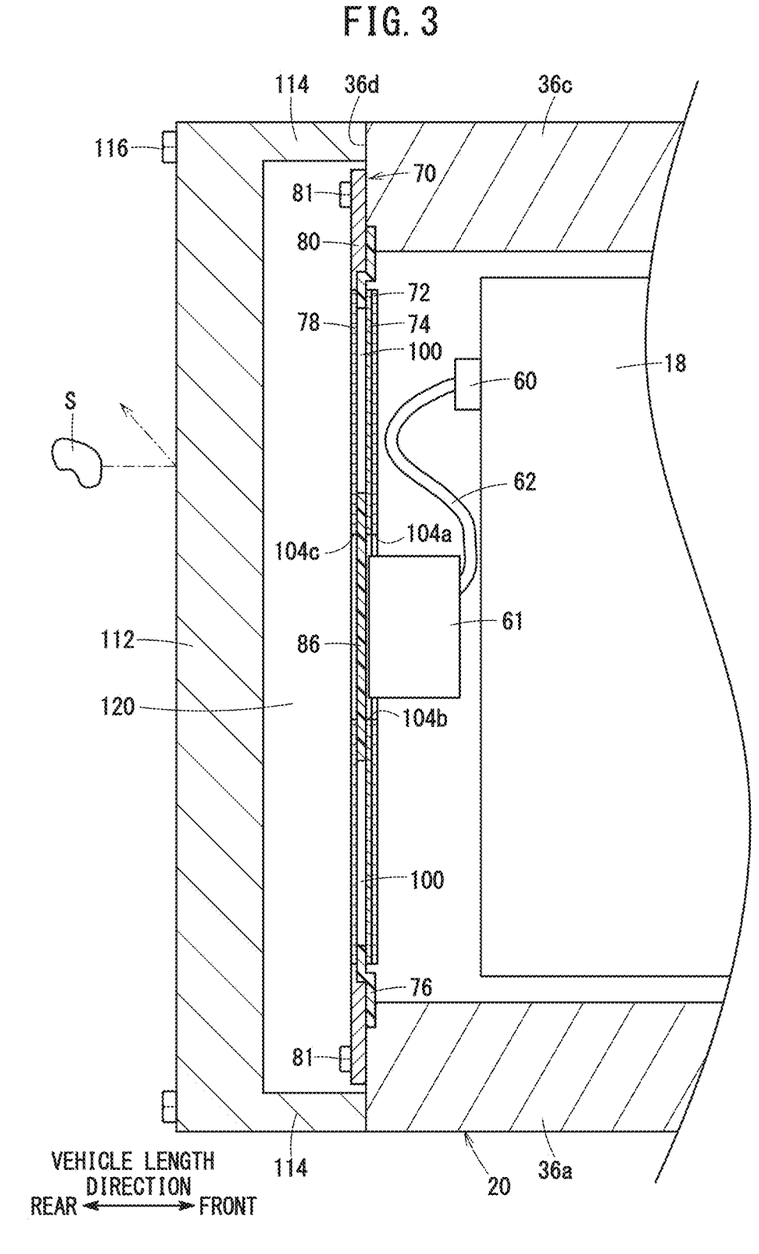
FIG. 3 is a schematic vertical sectional side view showing the vicinity of a connecting portion between the stack case and an electric equipment housing case.

The plurality of cell V terminals 60 are detachably provided at a rear portion of the fuel cell stack 18 facing the rear opening 40. The plurality of cell V terminals 60 are exposed to the rear opening 40. As shown in FIGS. 2 and 3, a harness 62 (a bundle of conductors) extends from the rear portion of the cell V terminal 60. The harness 62 transmits the detected cell voltage to a cell voltage control unit 61. The cell voltage control unit 61 collectively processes the voltage detected at the cell V terminals 60 internally and then transmits the processed voltage to the control system of the fuel cell stack 18.

Figure 4:
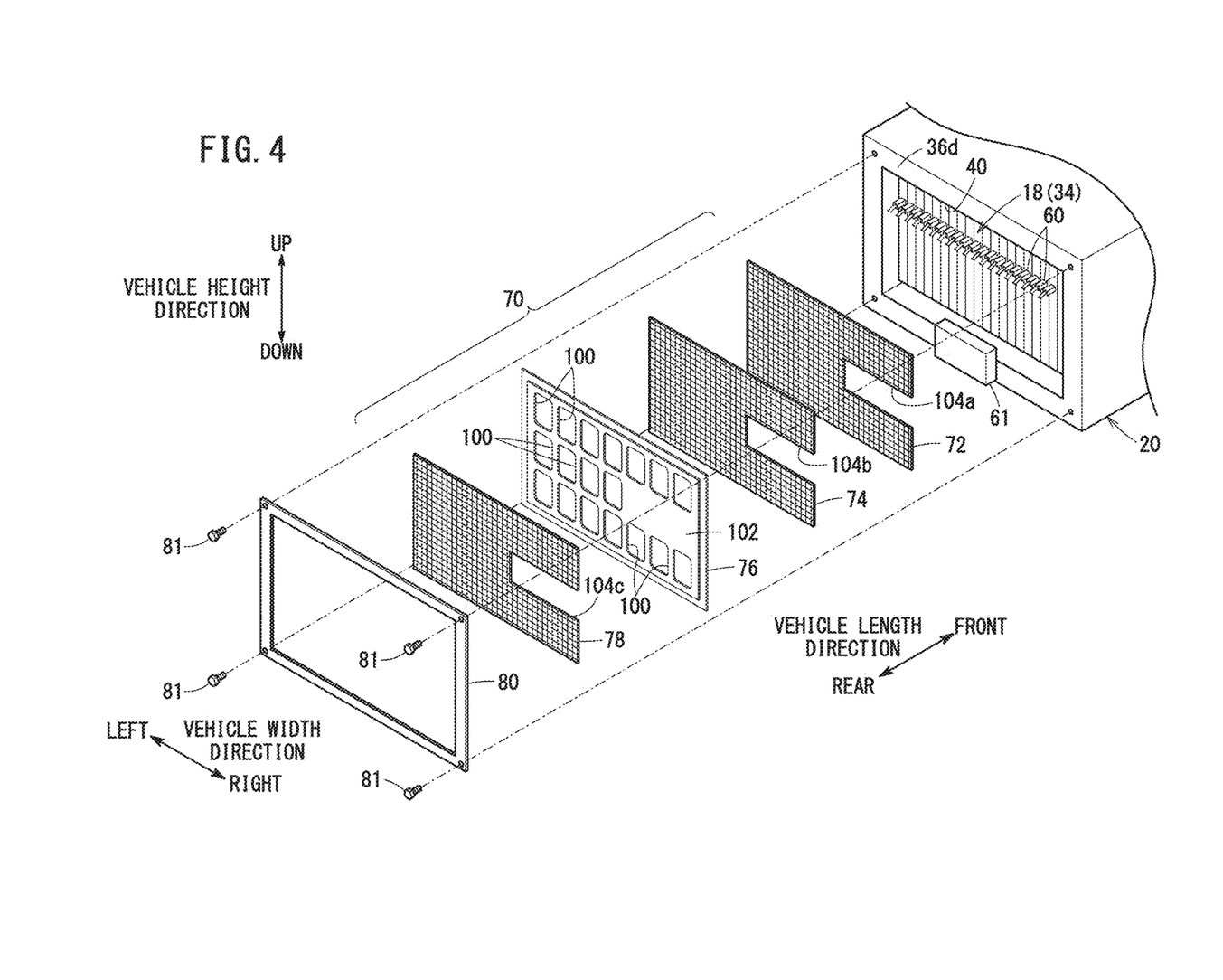
FIG. 4 is an exploded perspective view of the multilayer filter.
Figure 5:
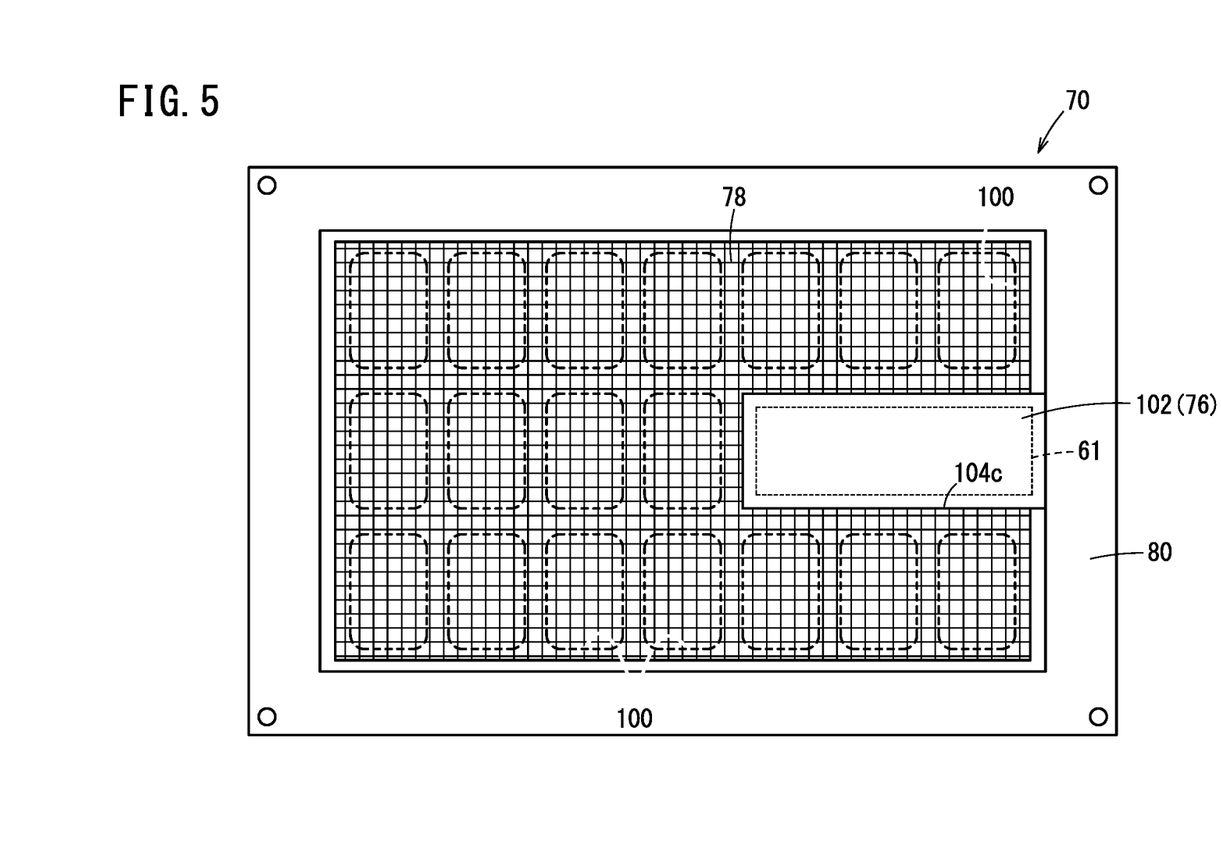
FIG. 5 is a schematic front view of a stacked filter as a porous cover.

As shown in detail in FIGS. 4 and 5, a multilayer filter 70 is provided as a porous cover at the rear opening 40. In this embodiment, the multilayer filter 70 includes an inner mesh member 72 as an inner cover, a filter member 74 as an intermediate cover, a frame-like holding body 76 (holding member), an outer mesh member 78 as an outer cover, and a seal plate 80. The inner mesh member 72, the filter member 74, the frame-like holding body 76, the outer mesh member 78, and the seal plate 80 are arranged in this order from the side closer to the stack case 20. The seal plate 80 is connected to the rear portion 36*d* of the stack case 20 with fixing bolts 81 shown in FIG. 4. In this way, the rear opening 40 is covered with the multilayer filter 70.

The inner mesh member 72 and the outer mesh member 78 protect the filter member 74 sandwiched between the mesh members 72 and 78. The outer mesh member 78 is formed of a net-like plate having relatively large spaces formed in a lattice shape or a circular shape. On the other hand, the filter member 74 is a plate material in which ventilation holes smaller than those of the outer mesh member 78 are formed. Therefore, the foreign matter not collected by the outer mesh member 78 is collected by the filter member 74.

Figure 6:
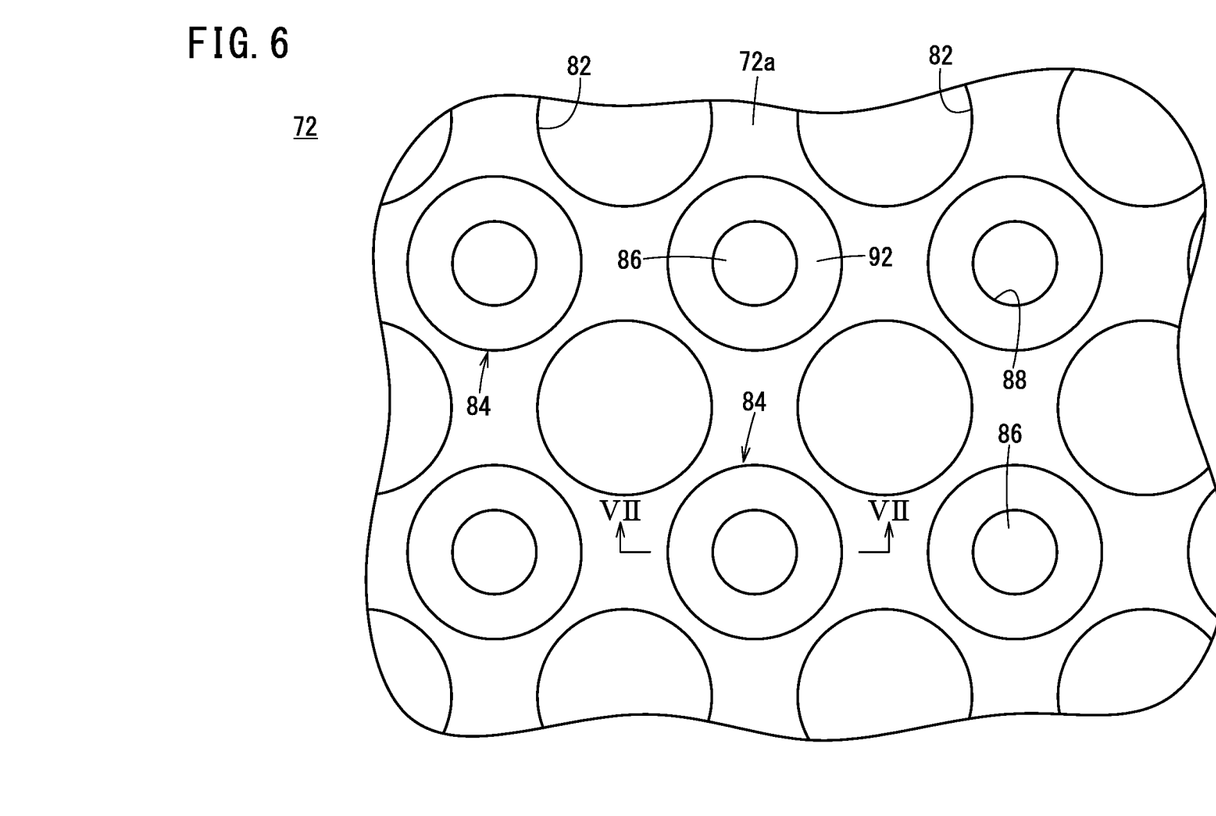
FIG. 6 is an enlarged front view of a main portion of an end face of an inner mesh member constituting the multilayer filter, the end face facing a cell voltage detection terminal.

FIG. 6 is an enlarged front view of a main portion of an inner end surface 72*a* of the inner mesh member 72, the inner end surface 72*a* facing the cell V terminal 60. Like the outer mesh member 78, the inner mesh member 72 is formed of a net-like plate having ventilation holes 82 (through holes or spaces) larger than the ventilation holes of the filter member 74 are formed in a circular or a lattice shape. In other words, the filter member 74 is formed with the ventilation holes that are finer than those of the inner mesh member 72.

Figure 7:
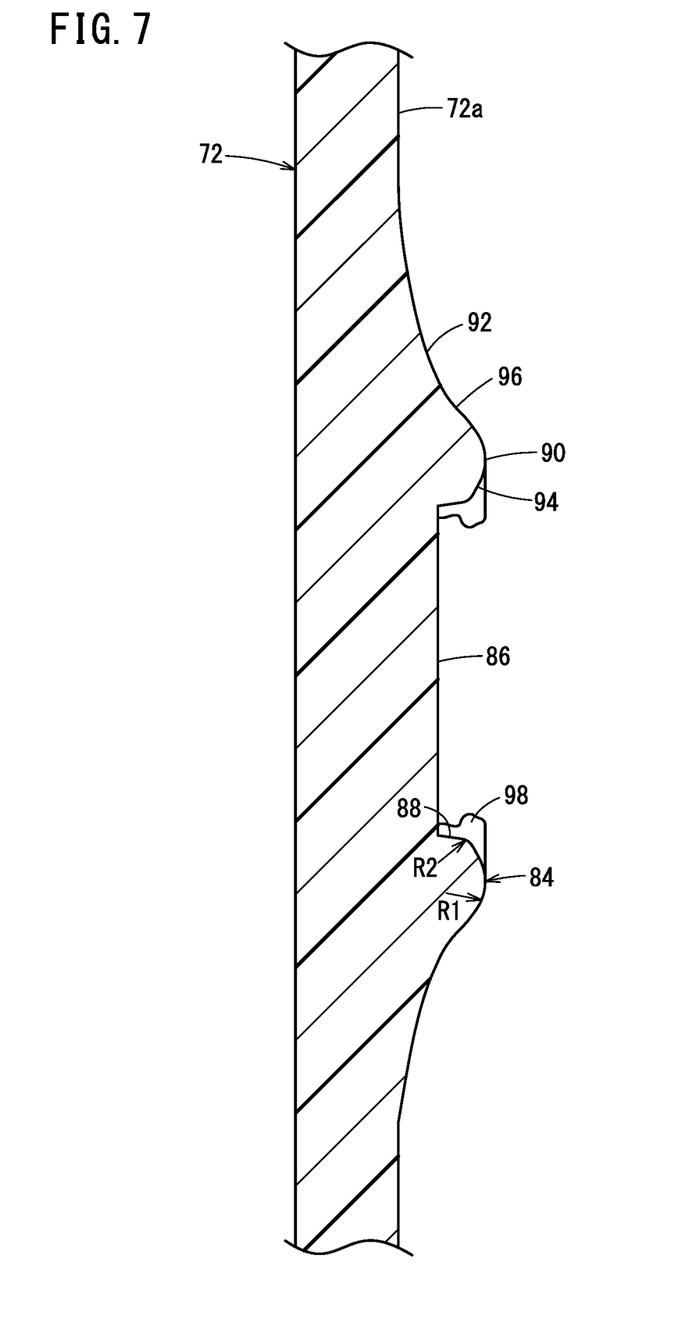
FIG. 7 is a cross-sectional view taken along line VII-VII in FIG. 6.

On the inner end surface 72*a*, an annular protrusion 84 protruding toward the unit cell 34 is formed at a position surrounded by the four ventilation holes 82. As shown in FIG. 7, which is a cross-sectional view taken along line VII-VII of FIG. 6, the annular protrusion 84 includes an inner bottom surface 86, an inner peripheral side surface 88, a top surface 90 that goes round a circle so as to have a substantially annular shape in a front view, and an outer peripheral side surface 92. The inner peripheral side surface 88 and the top surface 90 are continuous with each other via an inner curved portion 94. The top surface 90 and the outer peripheral side surface 92 are continuous with each other via an outer curved portion 96.

The outer peripheral side surface 92 is gently raised from the inner end surface 72*a* of the inner mesh member 72 and continues gently to the top surface 90 via the outer curved portion 96. The inside of the annular protrusion 84 is a concave space recessed relative to the annular protrusion 84. The inner peripheral side surface 88 is a wall surface bent steeply with respect to the top surface 90 and extending along the depth direction of the concave space. The depth direction of the concave space corresponds to the thickness direction of the filter member 74 and corresponds to the front-rear direction of the fuel cell vehicle 12. Since the outer peripheral side surface 92, the top surface 90, and the inner peripheral side surface 88 are connected in this manner, the radius of curvature R1 of the outer curved portion 96 is larger than the radius of curvature R2 of the inner curved portion 94.

The inner bottom surface 86 is continuous with the inner peripheral side surface 88 perpendicularly and is a wall surface extending along the vehicle height direction of the fuel cell vehicle 12. Therefore, the inner bottom surface 86 is substantially parallel to the inner end surface 72*a* of the inner mesh member 72. In the present embodiment, the inner bottom surface 86 is closer to the unit cell 34 (fuel cell stack 18) than the inner end surface 72*a* is. In other words, the inner bottom surface 86 and the inner end surface 72*a* are not flush with each other.

A burr 98 may be formed on the inner peripheral side surface 88 or the inner curved portion 94. The protruding direction of the burr 98 is inward in the diameter direction of the annular protrusion 84 for reasons to be described later.

The inner mesh member 72 having such a structure is made up from, for example, a fiber reinforced resin material that is glass fiber impregnated with resin. The outer mesh member 78 and the seal plate 80 are made up from a metal such as aluminum alloy, for example. The frame-like holding body 76 is made up from a fiber reinforced resin material that is glass fiber impregnated with resin, as in the case of the inner mesh member 72, for example.

As shown in FIG. 4, part of the frame-like holding body 76 is cut out in a lattice shape. Thus, a plurality of ventilation holes 100 are formed in the frame-like holding body 76. In this case, the ventilation holes 100 have vertically elongated rectangular shapes. In this embodiment, for example, the ventilation holes 100 are arranged in three rows in the vertical direction. Here, the frame-like holding body 76 is provided with a closing wall portion 102 so as to close about half of the ventilation holes 100 in the second row. The cell voltage control unit 61 faces the front surface of the closing wall portion 102. In the inner mesh member 72, the filter member 74, and the outer mesh member 78, notches 104*a* to 104c are respectively formed at portions corresponding to the closing wall portion 102 (portions where the closing wall portion 102 overlaps).

The inner mesh member 72, the filter member 74, and the outer mesh member 78 may be divided into a plurality of pieces corresponding to the lattice positions of the frame-like holding body 76.

As shown in FIGS. 2 and 3, the rear portion 36d of the stack case 20 is connected to a VCU case 112 (electric equipment housing case) that houses the VCU 110, which is electric equipment. Four mount portions 114 are provided on the front wall portion of the VCU case 112 facing the stack case 20. The mount portion 114 protrudes toward the stack case 20. Further, an insertion hole 118 is formed from the rear wall portion of the VCU case 112 to the front end surface of the mount portion 114. A mounting bolt 116 passed through the insertion hole 118 is screwed into a bolt hole (not shown) formed in the rear portion 36d of the stack case 20. Thus, the multilayer filter 70 is held in the stack case 20. The VCU case 112 is connected to the stack case 20.

At this time, the rear portion 36d (or the multilayer filter 70) of the stack case 20 and the front wall portion of the VCU case 112 are separated from each other by the projecting length of the mount portion 114. A gap is formed by this separation. Therefore, a ventilation opening 120 is formed between the adjacent mount portions 114.

The fuel cell system according to the present embodiment is basically constructed as described above, and its operations and effects will be described next.

During the operation of the fuel cell vehicle 12 shown in FIG. 1, fuel gas, oxygen-containing gas, and coolant are supplied to the fuel cell stack 18. The fuel gas is supplied to the anode electrode of each unit cell 34, and the oxygen-containing gas is supplied to the cathode electrode of each unit cell 34. As a result, electric power is generated in each unit cell 34, and the traveling motor 26 is driven. As a result, the fuel cell vehicle 12 starts traveling. Coolant is also supplied to each unit cell 34.

While the fuel cell vehicle 12 is traveling, there may be a case where foreign matter S such as small stones, for example, is thrown up by the tires and flies to the front room 16. When such a situation occurs, the foreign matter S will hit the VCU case 112. As can be understood from this case, the multilayer filter 70 is protected from the large foreign matter S entering the front room 16 by the VCU case 112 covering the multilayer filter 70.

When the foreign matter S enters between the stack case 20 and the VCU case 112 through the ventilation opening 120, the filter member 74 is protected by the outer mesh member 78. Therefore, it is possible to avoid the possibility that fine foreign matter cannot be captured due to breakage or the like of the filter member 74. Further, the cell voltage control unit 61 in the stack case 20 is also protected from foreign matter S by the closing wall portion 102 covering the cell voltage control unit 61.

Part of the running wind reaches the lower portion of the rear portion 36d of the stack case 20. Part of the running wind passes through the ventilation holes of the outer mesh member 78, the ventilation holes 100 of the frame-like holding body 76, the ventilation holes of the filter member 74, and the ventilation holes 82 of the inner mesh member 72, and enters the inside of the stack case 20 through the rear opening 40. When the running wind contains fine foreign matter such as sand grains or dust, the foreign matter is caught by the outer mesh member 78 and the filter member 74. Therefore, it is difficult for the foreign matter to enter the stack case 20.

The temperature of the fuel cell stack 18 in the stack case 20 rises as the unit cell 34 generates electric power. Therefore, heat is applied from the fuel cell stack 18 to the running wind entering the inside of the stack case 20. As a result, the running wind causes a temperature rise, and the temperature rises in the stack case 20. On the other hand, the fuel cell stack 18 is cooled by the running wind.

When fuel gas leaks from the fuel cell stack 18 into the stack case 20, the specific gravity of hydrogen in the fuel gas is smaller than that of air, and thus the hydrogen moves up in the stack case 20. The hydrogen having moved up joins the running wind. Accordingly, the running wind (and hydrogen) reaches the ventilation holes of the inner mesh member 72 through the upper portion of the rear opening 40.

Figure 8:
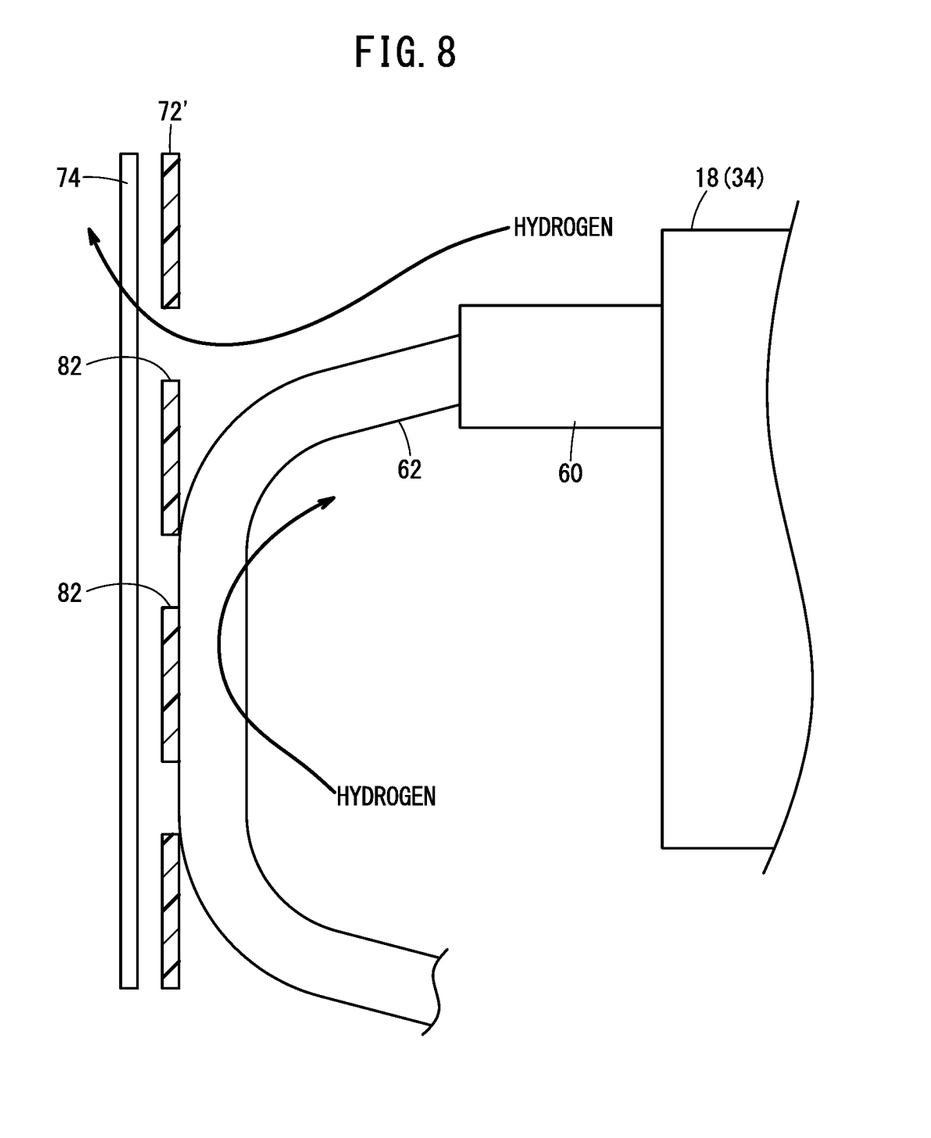
FIG. 8 is a schematic view showing an enlarged main portion in the vicinity of a rear opening of the stack case in the fuel cell system using the inner mesh member having no annular protrusion.

FIG. 8 is a view of an enlarged main portion of the structure using an inner mesh member 72' that does not have the annular protrusions 84. As described above, when the harness 62 comes close to the inner mesh member 72', it is possible that the harness 62 partially closes the ventilation holes. Under such circumstances, it becomes difficult to discharge running wind and hydrogen to the outside of the stack case 20 through the ventilation holes of the filter member 74, the ventilation holes 100 of the frame-like holding body 76, and the ventilation holes of the outer mesh member 78.

Figure 9:
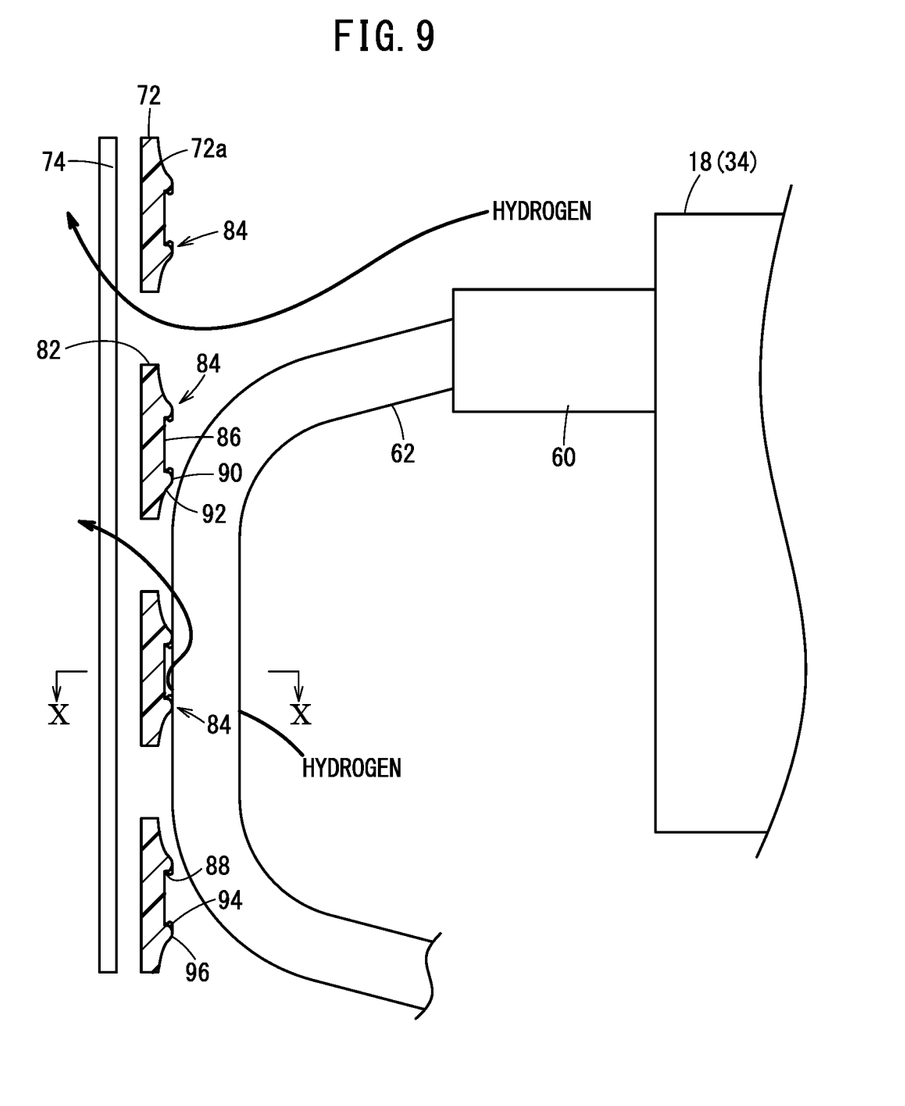
FIG. 9 is a schematic view of an enlarged main portion in the vicinity of a rear opening of the stack case in the fuel cell system using the inner mesh member shown in FIG. 6.
Figure 10:
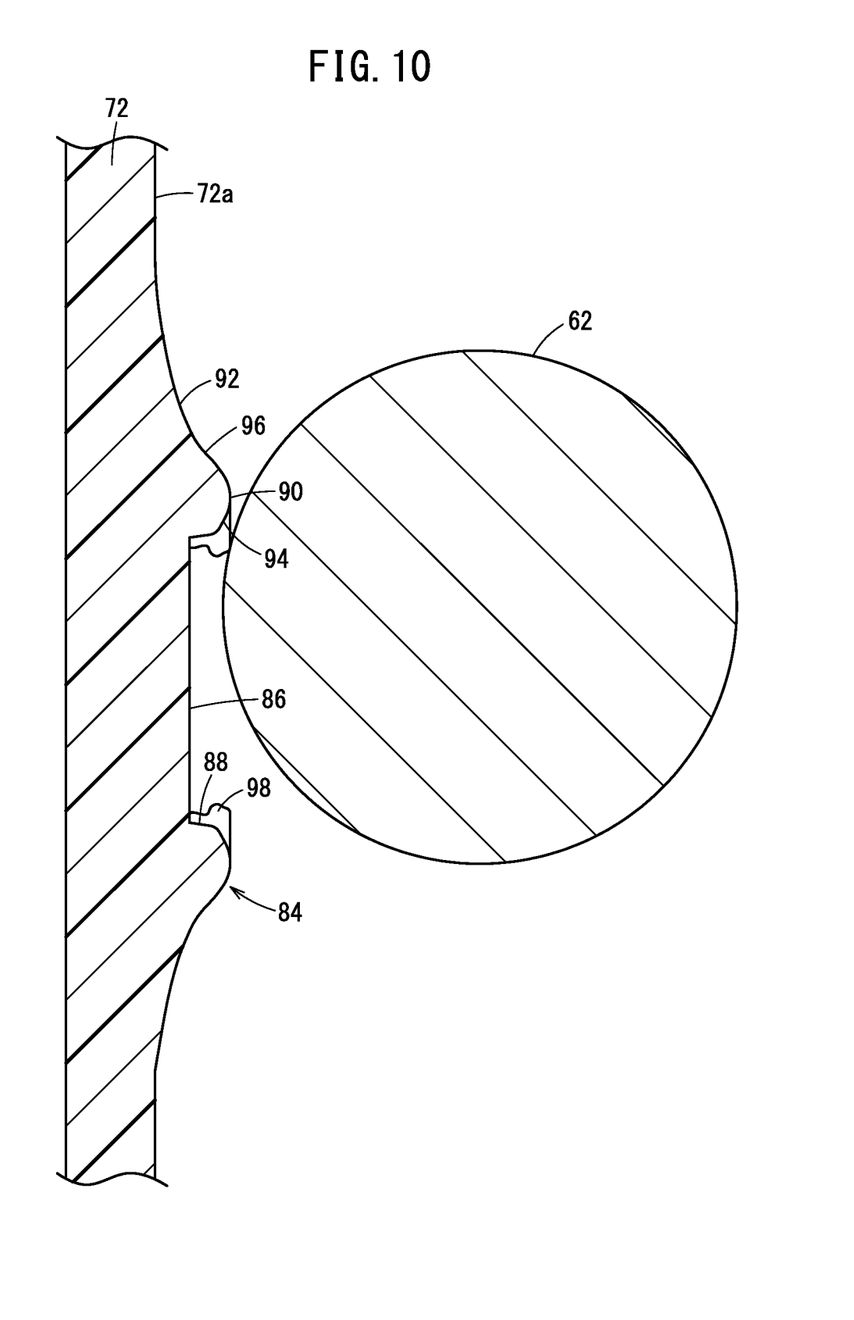
FIG. 10 is a cross-sectional view taken along line X-X in FIG. 9.

On the other hand, in this embodiment, the annular protrusions 84 are provided on the inner end surface 72a of the inner mesh member 72. In this case, even if the harness 62 comes close to the inner mesh member 72, as shown in FIGS. 9 and 10, the harness 62 is stopped by the annular protrusions 84 (typically the outer curved portion 96, the top surface 90, or the inner curved portion 94). Accordingly, the harness 62 makes point contact with the annular protrusions 84. Therefore, a clearance through which running wind and hydrogen can pass is formed between the annular protrusions 84 and the harness 62. In addition, the ventilation holes are prevented from being closed by the harness 62.

For this reason, the running wind and hydrogen pass through the clearance between the annular protrusions 84 and the harness 62, and are easily discharged to the outside of the stack case 20 through the ventilation holes of the inner mesh member 72, the ventilation holes of the filter member 74, the ventilation holes 100 of the frame-like holding body 76, and the ventilation holes of the outer mesh member 78. The running wind (and hydrogen) further reaches the front room 16 through the ventilation opening 120 and dissipates into the atmosphere from the front room 16.

By providing the annular protrusions 84 on the inner end surface 72a of the inner mesh member 72 in this manner, the running wind flowing into the stack case 20 can quickly flow out of the stack case 20 through the rear opening 40 and the multilayer filter 70. Therefore, when hydrogen leaks into the stack case 20, the hydrogen can be quickly discharged out of the stack case 20, accompanied by the running wind.

When the burr 98 forms on the annular protrusion 84, the burr 98 extends inward in the diameter direction of the annular protrusion 84. That is, the burr 98 is prevented from being exposed from the concave space. Therefore, the harness 62 is prevented from being caught by the burr 98. Further, since the outer curved portion 96, the top surface 90, and the inner curved portion 94 with which the harness 62 makes point contact are gentle curved surfaces, it is possible to prevent the harness 62 from being damaged because of the harness 62 being caught on any of the outer curved portion 96, the top surface 90, and the inner curved portion 94. For the reasons described above, there is no concern that the burr 98 or the annular protrusions 84 cause damage to the harness 62.

When maintenance is required for the fuel cell stack 18 (in particular, for example, the cell V terminals 60), an operator relaxes the mounting bolts 116 and removes the VCU case 112 from the stack case 20, and further relaxes the fixing bolts 81 and removes the multilayer filter 70 from the stack case 20. Since the rear opening 40 appears with this separation, maintenance can be easily performed on the cell V terminals 60 and the like exposed to the rear opening 40.

Next, a method for manufacturing the fuel cell system 10 according to the present embodiment will be described. The manufacturing method includes a step of manufacturing the inner mesh member 72.

The inner mesh member 72 can be obtained, for example, by injecting a molten resin containing glass fiber into a cavity formed in two molds. One mold is provided with an ejector pin 130 shown in FIG. 11. The ejector pin 130 can advance and retract with respect to the cavity. As is well known, the ejector pin 130 presses the obtained molded article to remove (release) the molded article from the mold.

Figure 11:
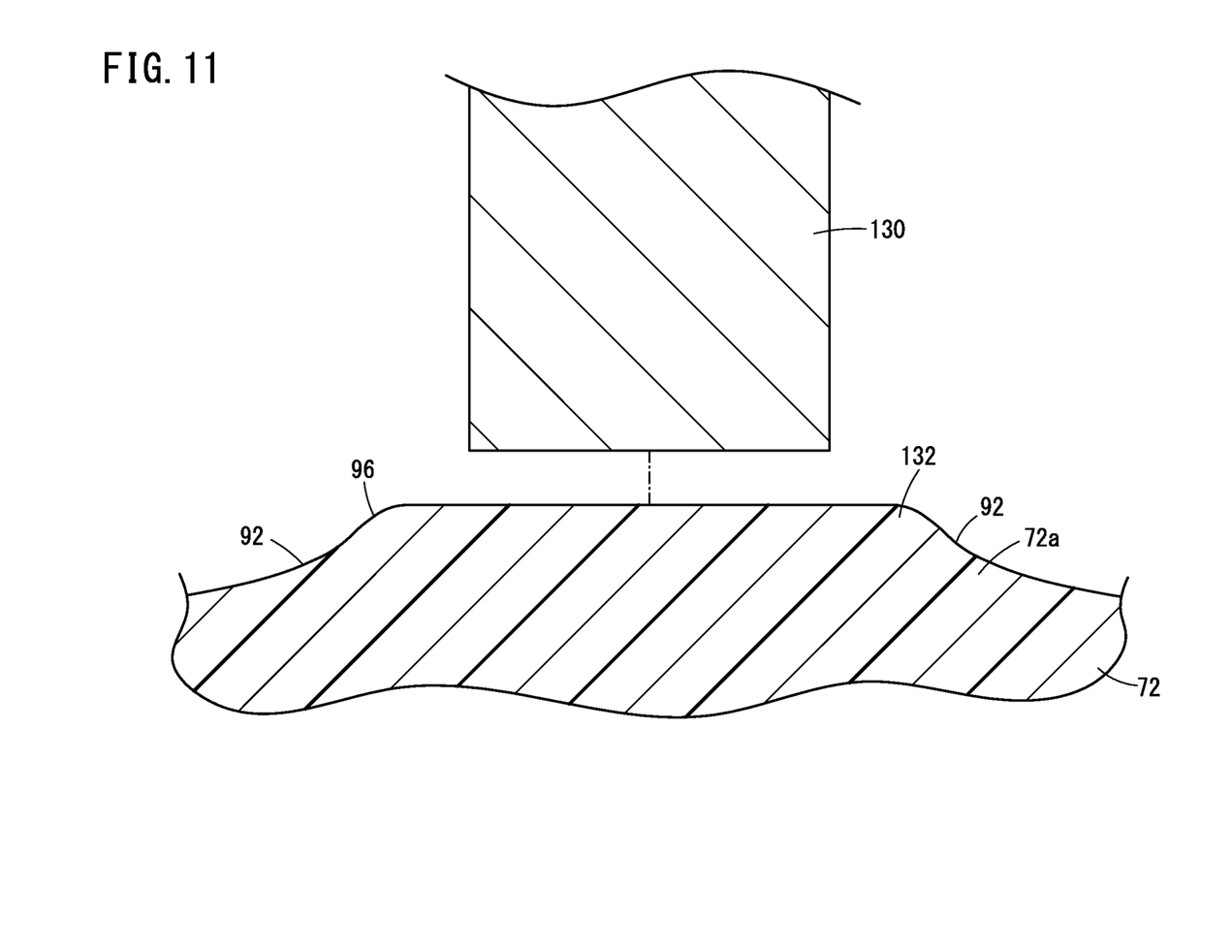
FIG. 11 is a schematic side view of a main portion showing a state in which the ejector pin faces a spare convex portion.
Figure 12:
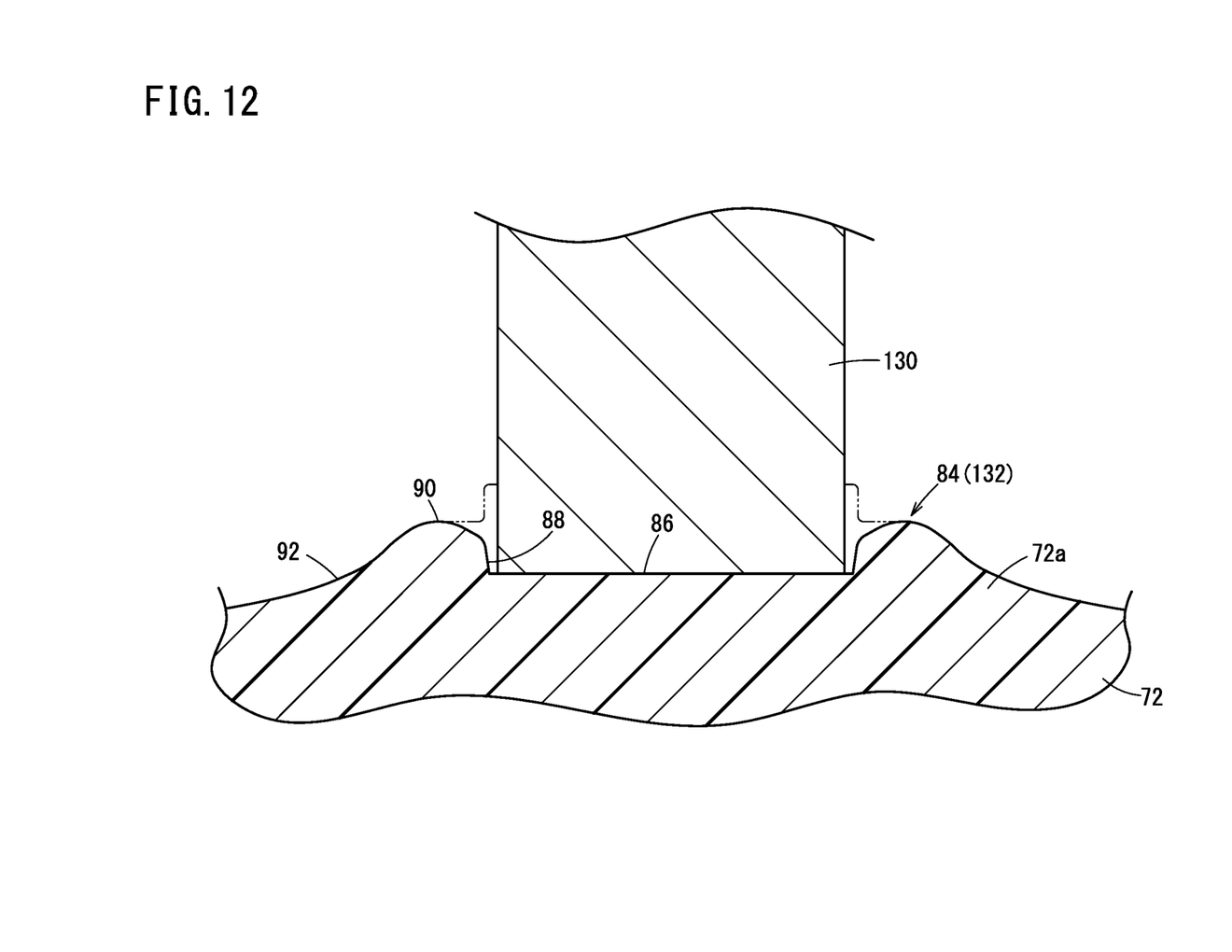
FIG. 12 is a schematic side view of a main portion showing a state in which the ejector pin is buried in the spare convex portion.

At the time of injection molding, a preliminary convex portion 132 having a substantially conical trapezoidal shape shown in FIG. 11 is formed on the end surface of the inner mesh member 72 that is the inner end surface 72a. As shown in FIG. 12, the ejector pin 130 advances at the time of removing a molded article from the mold after the mold opening and comes into contact with the flat top portion of the preliminary convex portion 132. In this state, the ejector pin 130 further advances and presses the preliminary convex portion 132. Because the preliminary convex portion 132 is unhardened and flexible, the tip of the ejector pin 130 is buried in the preliminary convex portion 132. In this way, a concave space having the inner bottom surface 86 and the inner peripheral side surface 88 is formed in accordance with the shape of the ejector pin 130. Accordingly, the annular protrusion 84 is formed. The embedding of the ejector pin 130 into the preliminary convex portion 132 is stopped to the extent that it does not reach the end face (inner end surface 72a) of the inner mesh member 72.

Figure 13:
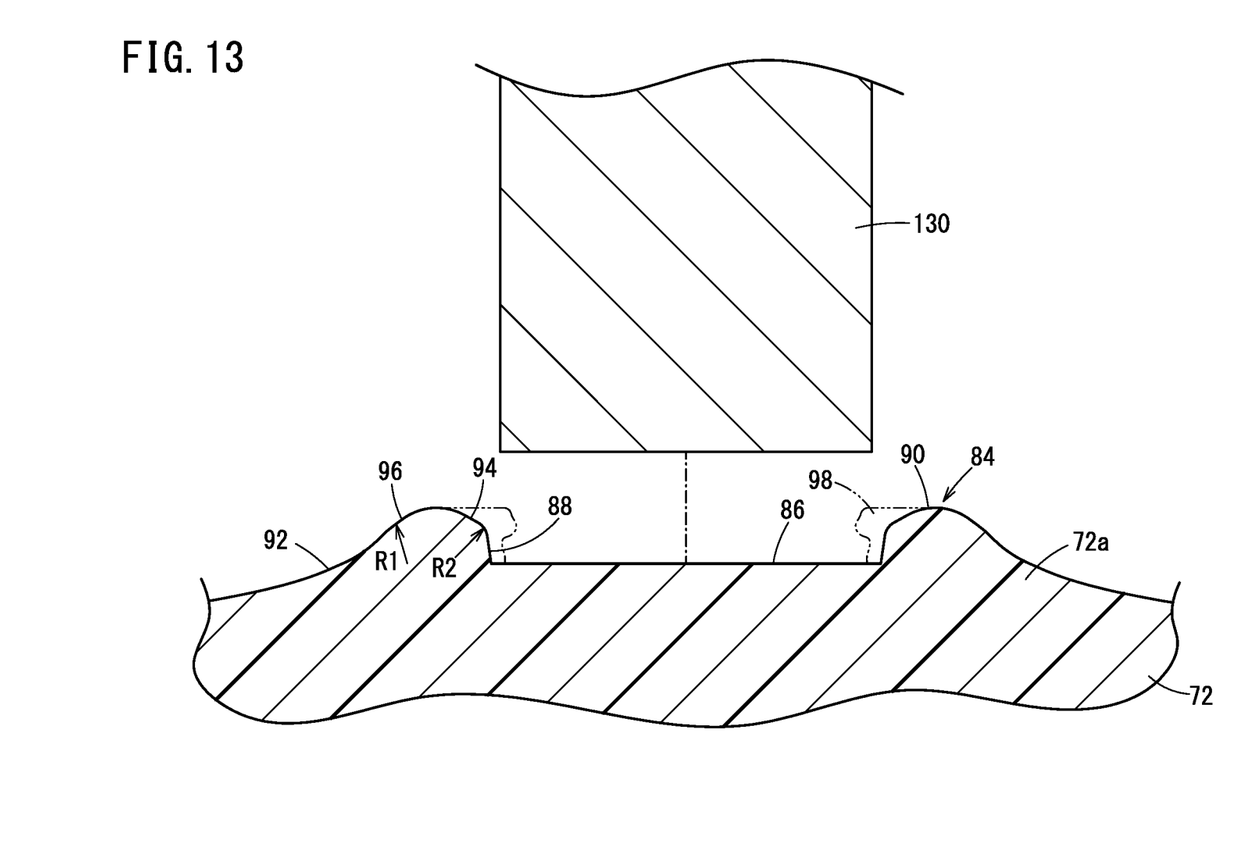
FIG. 13 is a schematic side view of a main portion showing a state in which the ejector pin is disengaged from the annular protrusion.

After the inner mesh member 72 is released in this manner, the ejector pin 130 is retracted. That is, the ejector pin 130 leaves the concave space. Since the advancing/retracting direction of the ejector pin 130 with respect to the preliminary convex portion 132 and the annular protrusion 84 is as described above, the burr 98 protrudes in the direction of narrowing the inner diameter of the concave space at the inner peripheral side surface 88 or the inner curved portion 94 as shown in FIG. 13.

Next, the fuel cell stack 18 is housed in the stack case 20. On the other hand, the multilayer filter 70 (porous cover) including an inner mesh member 72 covers the rear opening 40 of the stack case 20. The process of the fuel cell stack 18 being housed in the stack case 20 and the process of attaching the multilayer filter 70 to the rear opening 40 are performed in any order. That is, the attaching may be performed after the housing, or the housing may be performed after the attaching. As shown in FIG. 2, after the fuel cell stack 18 is housed in the stack case 20, the right opening 42a is closed by the first end plate 44 and the left opening 42b is closed by the auxiliary machine case 46.

When the fuel cell stack 18 is housed in the stack case 20, a portion where the cell V terminals 60 are provided faces the rear opening 40. The multilayer filter 70 in which the inner mesh member 72, the filter member 74, the frame-like holding body 76, the outer mesh member 78 and the seal plate 80 are arranged in this order from the side closer to the stack case 20 is attached to the rear opening 40. The inner mesh member 72 has an end face provided with the annular protrusion 84 and the end face faces the fuel cell stack 18.

Further, the seal plate 80 is connected to the rear portion 36d via the fixing bolts 81. Thus, the fuel cell stack 18 is housed in the stack case 20. Further, the rear opening 40 is covered by the multilayer filter 70. In the inner mesh member 72 constituting the multilayer filter 70, the inner end surface 72a provided with the annular protrusion 84 faces the fuel cell stack 18.

Here, at the time of injection molding of the inner mesh member 72, the burial of the ejector pin 130 into the preliminary convex portion 132 is stopped to such an extent that it does not reach the end face (inner end surface 72a) of the inner mesh member 72 as described above. Therefore, the inner bottom surface 86 of the annular protrusion 84 (concave space) is closer to the fuel cell stack 18 than the inner end surface 72a.

Further, the VCU case 112 is attached to the rear portion 36d of the stack case 20. That is, the mounting bolts 116 are inserted into the insertion holes 118 and screwed into bolt holes (not shown). Thus, the fuel cell system 10 shown in FIG. 2 is constructed.

The present invention is not limited to the above-described embodiments, and various configurations can be adopted therein without departing from the essence and gist of the present invention.

For example, the ventilation holes 100 of the frame-like holding body 76 may have a shape other than a rectangular shape (circular shape or the like).

In this embodiment, each of the multilayer filter 70 and the VCU case 112 is attached to the stack case 20 with the fixing bolts 81 and the mounting bolts 116. Alternatively, the bolts for attaching the multilayer filter 70 to the stack case 20 and the bolts for connecting the VCU case 112 may be the same bolts.

What is claimed is:

1. A fuel cell system comprising: a fuel cell stack in which a plurality of unit cells are stacked; and a stack case that houses the fuel cell stack, wherein:
   an opening is formed at an end portion of the stack case;
   a cell voltage detection terminal electrically connected to an electrode of the unit cell is provided at a position of the unit cell facing the opening, and a conductor extends from the cell voltage detection terminal;
   a porous cover formed with a plurality of through-holes is provided so as to cover the opening;
   an annular protrusion located among the plurality of through-holes is formed on an end face of the porous cover facing the cell voltage detection terminal; and
   a top surface and an inner peripheral side surface of the annular protrusion are continuous with each other via an inner curved portion and the top surface and an outer peripheral side surface are continuous with each other via an outer curved portion.

2. The fuel cell system according to claim 1, wherein the porous cover is a stacked body having an inner cover, an intermediate cover, and an outer cover, and the inner cover, the intermediate cover, and the outer cover are arranged in this order from a side closer to the stack case, and the annular protrusion is formed on an end face of the inner cover facing the cell voltage detection terminal.

3. The fuel cell system according to claim 1, wherein the annular protrusion is formed at a position surrounded by four through-holes among the plurality of through-holes.

4. The fuel cell system of claim 1, wherein an inner bottom surface of the annular protrusion is closer to the fuel cell stack than the end surface of the porous cover is.

5. The fuel cell system according to claim 1, wherein a radius of curvature of the outer curved portion is larger than a radius of curvature of the inner curved portion.

6. A method for manufacturing a fuel cell system including: a fuel cell stack in which a plurality of unit cells are stacked; and a stack case that houses the fuel cell stack, the method comprising:

a step of producing a member for a porous cover in which a plurality of through-holes are formed, an annular protrusion protruding among the plurality of through-holes is formed on one end surface, a top surface and an inner peripheral side surface of the annular protrusion are continuous with each other via an inner curved portion, and the top surface and an outer peripheral side surface are continuous with each other via an outer curved portion; and a step of housing the fuel cell stack in the stack case and covering an opening formed at an end face of the stack case with a porous cover including at least the member, wherein the fuel cell stack is housed in the stack case in a manner that a cell voltage detection terminal electrically connected to an electrode of the unit cell and a conductor extending from the cell voltage detection terminal face the opening, and the opening is covered with the porous cover in a manner that the annular protrusion faces the cell voltage detection terminal.

7. The method according to claim 6, wherein the member is molded using a mold and the annular protrusion is formed by pressing the member with an ejector pin when the member is removed from the mold.

* * * * *